INVENTOR
JAMES C. WISE

INVENTOR
JAMES C. WISE

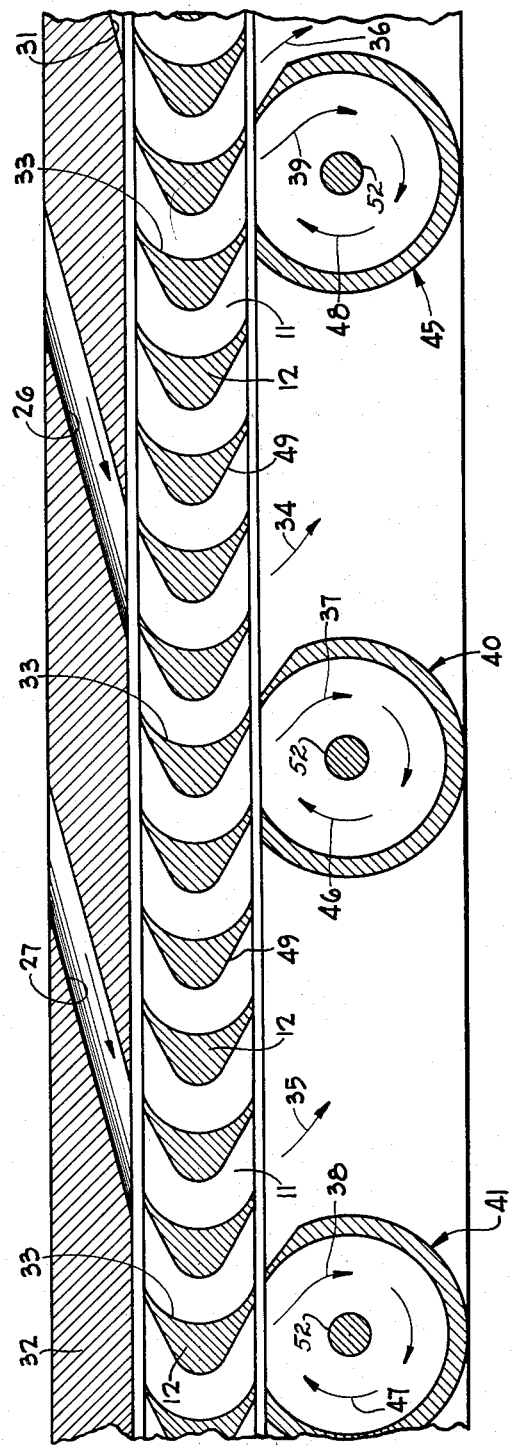

United States Patent Office 2,988,326
Patented June 13, 1961

2,988,326
TURBINE SPEED CONTROL APPARATUS
James C. Wise, Euclid, Ohio, assignor to Thompson Ramo Wooldridge Inc., a corporation of Ohio
Filed May 16, 1955, Ser. No. 508,421
8 Claims. (Cl. 253—59)

This invention relates to turbine speed control apparatus and more particularly to apparatus for using a fluid stream to control the speed of operation of a turbine.

For efficiency and compactness, turbines are very often designed to rotate at a very high velocity with centrifugal forces on the rotating elements thereof approaching the elastic limits of the materials used. If turbines so designed are utilized to drive a load subject to a sudden change from a normal value to a comparatively small value, the results can be disastrous because with a light load, the turbine may be rapidly accelerated to an excessive speed to result in disintegration of the rotating parts, to not only ruin the turbine but also endanger objects and persons in the vicinity.

For example, a turbine used to drive an aircraft fuel pump should have the minimum possible weight and should therefore be designed to rotate at a very high velocity. However, during abnormal flight conditions, there may be no fuel supply to the pump inlet and the pump may provide an extremely light load on the turbine, with highly deleterious results as pointed out above.

The speed of a turbine could be regulated by using speed responsive means to control the inlet pressure or the engagement of frictional braking surfaces. However, because of the very high speeds involved, systems of such types tend to become elaborate and it is difficult to obtain reliable operation which, of course, is highly essential.

This invention was evolved with the general object of providing a simple, efficient and reliable system using a fluid stream acting on a turbine element to control the speed thereof.

A more specific object of the invention is to provide a speed-limiting control for turbines used to drive a load subject to sudden variations from substantial values to very low values, and particularly for a turbine used to drive an aircraft fuel pump.

This invention may be applied to a turbine of the type having nozzle means for ejecting a fluid jet stream and a wheel having vanes movable through the path of the jet stream to receive drive thrust therefrom. It has been found that with virtually all turbines of this type, the path of the jet stream discharged from the vanes shifts as the velocity of the vanes changes relative to the velocity of the jet stream. According to an important feature of this invention, baffle means are disposed in a position such as to be in the path of fluid discharge from the turbine vanes when the velocity of the vanes relative to the velocity of the jet stream used to drive the vanes lies in a certain limited range. Such baffle means may be so disposed as to be in the path of fluid discharged from the vanes only after the velocity of the vanes reaches a certain value relative to the velocity of the actuating jet stream, so as to oppose the action of the jet stream and achieve an automtaic speed-limiting action.

According to another feature of the invention, means are provided for automatically directing a fluid stream against the vanes of the turbine in opposition to the actuating jet stream when the velocity of the vanes relative to the velocity of the jet stream lies in a certain limited range.

Another feature of the invention lies in directing fluid discharged from the vanes of a turbine wheel back against such vanes in opposition to the actuating jet stream to obtain automatic speed control. In accordance with a specific feature of the invention, this is achieved by baffle means having a smoothly curved surface arranged to gradually alter the flow direction of the discharged fluid stream and direct the discharged fluid stream back against the vanes in opposition to the jet stream.

A still further feature of the invention is in the provision of means for adjusting the position of baffle means relative to the nozzle means for adjusting the range of relative velocities in which the baffle means is disposed in the path of fluid discharged from the turbine vanes.

Yet another feature of the invention is in an arrangement of nozzle means and turbine vanes in a manner such that the path of fluid discharged from the vanes shifts to a large extent with changes in the velocity of the vanes relative to the actuating jet stream.

A still further feature of the invention is in the provision of vanes of a particular configuration such as to achieve maximum efficiency and reliability of speed control.

This invention contemplates other objects, features and advantages which will become more fully apparent from the following detailed description taken in conjunction with the accompanying drawings which illustrate a preferred embodiment and in which:

FIGURE 4 is a plane development of a cross-section taken substantially along an arcuate line IV—IV of FIGURE 3.

Figure 1:
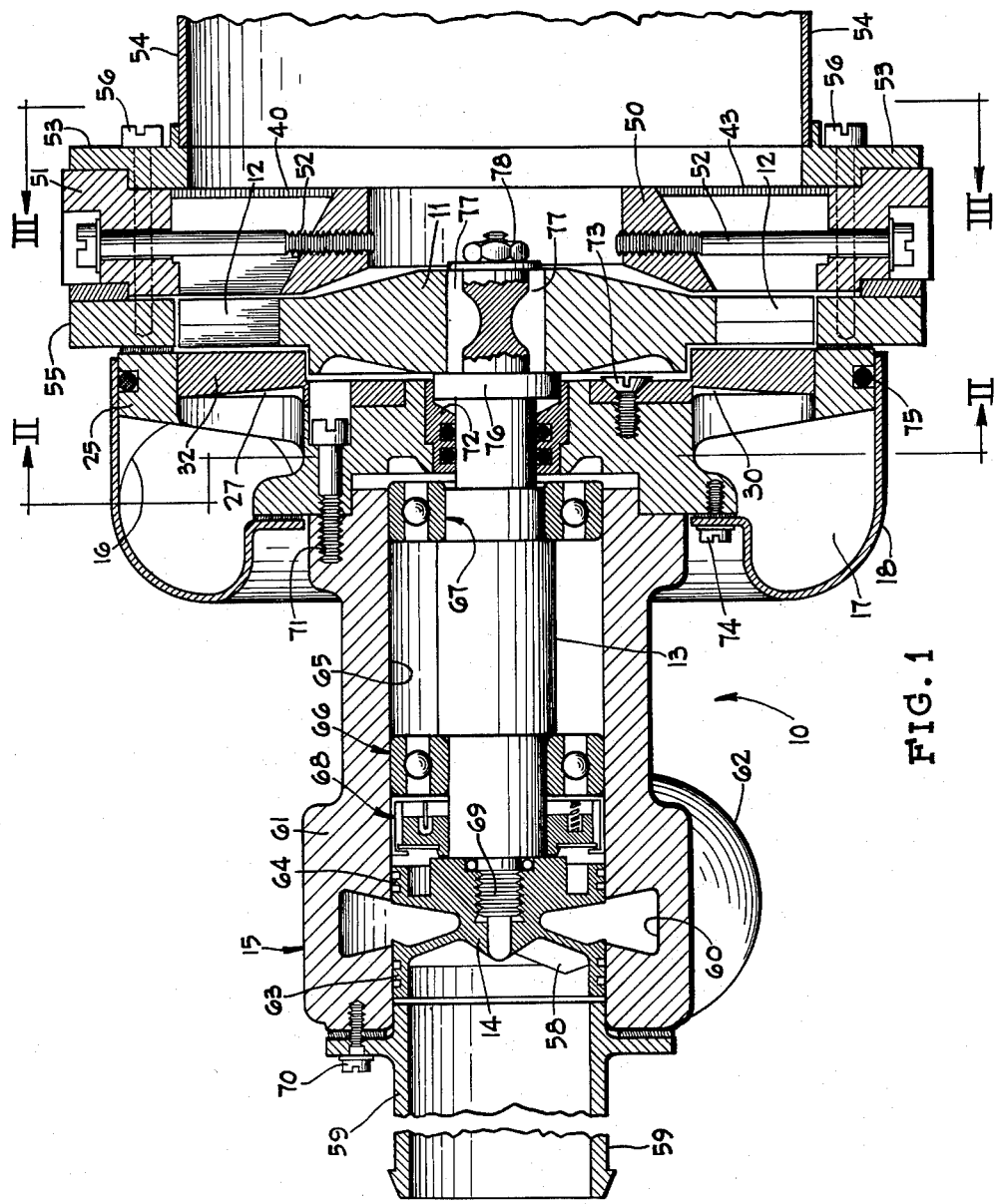
FIGURE 1 is an elevational cross-sectional view through a combination fuel pump and turbine unit constructed in accordance with the principles of this invention.
Figure 3:
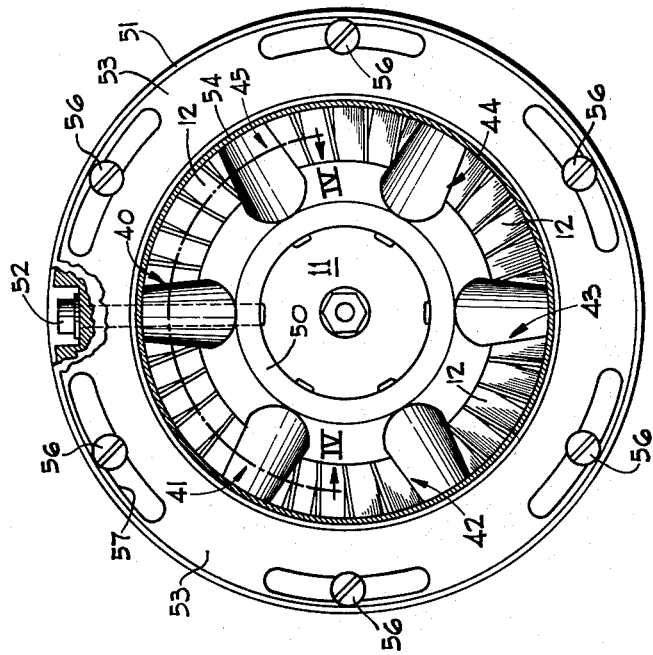
FIGURE 3 is a cross-sectional view taken substantially along line III—III of FIGURE 1.
Figure 2:
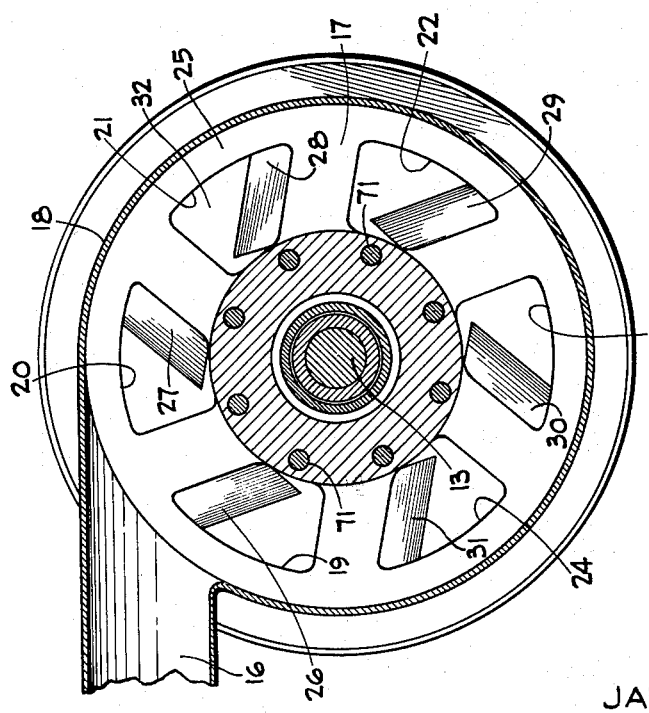
FIGURE 2 is a cross-sectional view taken substantially along line II—II of FIGURE 1.

Reference numeral 10 generally designates a combination fuel pump and turbine unit particularly designed for use in aircraft. In the unit 10, a turbine wheel 11 having a plurality of circumferentially spaced radially extending blades or vanes 12 is mounted on one end of a shaft 13 with the other end of the shaft being coupled to a centrifugal type pumping rotor 14 of a fuel pump generally designated by reference numeral 15.

To drive the turbine wheel 11 and thereby the pump rotor 14, fluid under pressure, such as compressed air, is introduced through an inlet 16 into an annular chamber 17 about the shaft 13 on one side of the circular path of movement of the vanes 12, the inlet 16 and annular chamber 17 being at least partially defined by a shroud member 18. Fluid under pressure passes from the annular chamber 17 through a plurality of arcuately spaced openings 19, 20, 21, 22, 23 and 24 in a support ring 25 and thence through a like plurality of arcuately spaced passages 26, 27, 28, 29, 30 and 31 in a nozzle ring 32 against the vanes 12 of the turbine wheel 11. The mouth ends of the passages 26–31 register with the openings 19–24 of the support ring 25 and the passages 26–31 are inclined to extend arcuately to a substantial extent, to impinge the fluid against the vanes 12 at an acute angle relative to the path of travel thereof, as is best illustrated in the plane development of FIGURE 4.

The fluid jet streams ejected from the nozzle apertures 26–31 of the nozzle ring 32 are impinged against front surfaces 33 of the vanes 12 and are discharged axially to the right, as viewed in FIGURE 1. The position of the paths of the discharged fluid streams is dependent upon the velocity of travel of the vanes 12 relative to the velocity of the actuating jet streams, the paths of the discharged streams being displaced in the direction of travel of the vanes, as the velocity of the vanes is increased. As shown in FIGURE 4, the paths of the streams discharged from the nozzle passages 26, 27 and 31 may be generally along arrows 34, 35 and 36 with normal velocity of the vanes, but when the velocity of the vanes is increased to a certain extent, the paths of the discharged streams may be along arrows 37, 38 and 39.

According to this invention, baffle means generally designated by reference numerals 40, 41, 42, 43, 44 and 45 are respectively disposed in the path of fluid streams discharged from the nozzle passages 26–31 when the velocity of the vanes relative to the actuating jet streams lies in a certain range, and such baffle means are arranged to direct the discharged fluid streams back against the vanes to oppose the action of the actuating jet streams and control or limit the velocity of the vanes.

The baffle means 40–45 are preferably in the form of tubes having axes extending radially from the axis of the wheel 11 with the side of each tube adjacent the path of vanes 12 being cut off in a chordal plane to provide an opening for entrance and exit of the fluid. As shown in FIGURE 4, the baffle tubes 40, 41 and 45 may be disposed in the path of fluid discharged along the arrows 37, 38 and 39, and the internal cylindrical surfaces of the tubes serve to gradually reverse the directions of flow with the fluid streams being discharged from the tubes along arrows 46, 47 and 48. The discharged fluid streams are impinged against rear surface portions 49 of the vanes 12, the rear surface portions 49 being arranged to face in a direction generally opposite the direction of the streams discharged from the baffle means 40–45 and in a direction at an acute angle to the direction of travel of the vanes 12, so that the coaction of the fluid streams discharged from the baffles 40–45 with the rear surface portions 49 opposes the action of the actuating jet streams on the front surfaces 33 of the vanes 12.

While the illustrated baffle tubes 40–45 are cylindrical, it should be understood that the external tube shape can be altered as desired to suit other turbine requirements. Thus, the external baffle shape could resemble an airfoil which may aid the diffusion process.

For support of the baffle tubes 40–45, the radially inward ends thereof may be brazed or otherwise secured to an outwardly facing generally frusto-conical surface of an inner support ring 50, and an outer support ring 51 surrounds the tubes 40–45 and engages the outer ends thereof, the inner and outer support rings 50 and 51 being preferably secured together by bolts 52 extending axially through the tubes 40–45 with the inner ends of the bolts 52 threaded into the inner support ring 50.

It may be noted that the bolts 52 not only serve as a means for securing the rings 50, 51 together, but also serve to cooperate with the inner surfaces of the tubes 40–45 to define passages for fluid flow in the tubes.

A flange ring 53 is disposed against the outer ring 51 and is secured to the end of a conduit 54 which provides a path or outlet for the fluid discharge from the turbine. The flange ring 53 together with the support ring 51 are secured to a ring 55 surrounding the vanes 12 by means of a plurality of circumferentially spaced bolts 56, the ring 55 being secured to the ring 25.

According to a specific feature of the invention, means are provided for adjustment of the position of the baffle means 40–45 relative to the nozzle passages 26–31. For this purpose, the rings 51 and 53 are provided with registering arcuately extending slots 57 through which the bolts 56 extend to permit rotation of the ring 51 and thereby rotation of the baffle tubes 40–45. Thus, the speed of rotation of the turbine wheel 11 may be limited to any desired value.

It should be noted that the configuration of the vanes 12 and the relation of the nozzle passages 26–31 relative to the vanes is of some importance. In particular, the axis of the wheel 11 is generally transverse (i.e. at an angle greater than 45°) to the jet streams from the nozzle passages 26–31 so that the jet streams are at a sharply acute angle to the circular path of travel of the vanes 12. The front surfaces 33 of the vanes 12 which receive the fluid stream thereagainst face in a direction generally opposite the direction of travel, the result of this arrangement being such that the paths of the discharged fluid streams are displaced to a maximum extent with changes in the velocity of travel of the vanes relative to the velocity of the fluid jet streams.

As above noted, the rear surface portions 49 of the vanes 12 face in a direction at an acute angle to the direction of travel of the vanes 12. Such surface portions 49 form parts of generally convex cylindrical rearward faces of the vanes 12 and the front faces 33 of the vanes are complementarily concave with such front and rear faces together defining smoothly curving fluid flow paths. Thus, the configuration of the vanes 12 provides smooth fluid flow paths with minimum turbulence, provides a maximum displacement of the position of the discharge paths with changes in velocity, and provides surface portions for reaction with the fluid streams from the baffle means 40–45 to control and limit vane velocity.

As previously indicated, the turbine is operated at a very high velocity for maximum efficiency and power output relative to size and weight and the pump 15 is desirably of the centrifugal type with the rotor 14 having a plurality of circumferentially spaced pumping vanes 58 for receiving fluid from an inlet conduit fitting 59 and discharging the fluid radially outwardly into an annular outlet chamber 60 in a casing 61, the fluid flowing from the outlet chamber 60 to a conduit fitting 62 and thence through suitable conduits to a point of utilization. The rotor 14 has a pair of integral axially spaced cylindrical portions 63 and 64 arranged for sealing engagement with internal cylindrical surface portions of a bore 65 through the casing 61 on either side of the outlet chamber 60.

To assemble the combined turbine and pump unit 10, the shaft 13 is supported within the bore 65 of the casing 61 by a pair of ball bearing assemblies 66 and 67, a conventional seal unit 68 is disposed on the pump end of the shaft 13 and the pump rotor 14 is screwed on a threaded end portion 69 of the shaft 13 after which the inlet conduit fitting 59 may be secured on the end of the casing 15 by screws 70.

The support ring 25 is secured on the turbine end of the casing 61 by a plurality of circumferential spaced screws 71 with a seal assembly 72 between the inside of the ring 25 and the shaft 13. The nozzle ring 32 is secured to the support ring 25 by a plurality of circumferentially spaced counter-sunk screws 73 and the shroud member 18 is secured to the support ring 25 by a plurality of circumferentially spaced screws 74 with a seal ring 75 between the outer periphery of the ring 25 and an internal surface portion of the shroud member 18.

The turbine wheel 11 is disposed against an abutment ring 76 on the shaft 13 with keys 77 between the wheel 11 and the shaft 13 and with a nut 78 threaded on the end of the shaft 13 to hold the wheel 11 on the shaft. The ring 55 is secured to the ring 25 and the rings 51 and 53 are secured to the ring 55 by the bolts 56 as above indicated.

It will, accordingly, be appreciated that this invention provides a simple and reliable system of turbine speed control utilizing the coaction of a fluid stream and a turbine element. The system is particularly advantageous in the disclosed combination of a turbine and centrifugal type pump, since such a pump is subject to sudden load variations from substantial values to very low values.

It will be understood that modifications and variations may be effected without departing from the spirit and scope of the novel concepts of the present invention.

I claim as my invention:

1. A turbine comprising a casing, a rotatable turbine wheel having circumferentially spaced vanes around the periphery thereof disposed in said casing, each of said vanes having a front driving face and a rear retarding face, a nozzle plate in said casing on one lateral side of said turbine wheel providing nozzles discharging against the front driving faces of said vanes, said casing defining a propelling fluid inlet chamber for feeding fluid to each of said nozzles, said casing having a lateral extending discharge chamber opposite said inlet chamber receiving propelling fluid from said vanes, a plurality of circumferentially spaced baffles in said discharge chamber extending longitudinally alongside said vanes to receive propelling fluid thereagainst whenever the turbine wheel exceeds a predetermined velocity, and each of said baffles being shaped to direct the propelling fluid received thereagainst back to the back faces of the vanes in a direction opposing the direction of feed of said nozzles for retarding the velocity of said turbine wheel.

2. A turbine comprising a casing having a fluid inlet chamber and a fluid outlet chamber on opposite lateral sides therof, a turbine wheel rotatable in said casing having circumferentially spaced turbine vanes around the periphery thereof between said inlet and said outlet chambers, nozzle means between said inlet chamber and said vanes for ejecting a fluid jet stream against the vanes to drive the wheel, a plurality of circumferentially spaced tubes in the outlet chamber alongside of said vanes and communicating with the spaces between the vanes along the lengths thereof, and said tubes being positioned circumferentially downstream from adjacent nozzles to receive fluid from the vanes whenever the velocity of the wheel exceeds a predetermined range and to direct the fluid against the back faces of the vanes for impeding rotation of the wheel.

3. A turbine comprising a casing having a propelling fluid inlet chamber and a discharge chamber on opposite lateral sides thereof, a turbine wheel having circumferentially spaced vanes radiating therefrom in said casing between said inlet and outlet chambers, nozzle means in said casing between the inlet chamber and said vanes having passageways communicating with the vanes at spaced intervals around the circumference of the wheel for impinging propelling fluid from said inlet chamber against said vanes to drive the wheel, a baffle assembly having circumferentially spaced radially extending tubes alongside of said vanes and in communication therewith along the length of said vanes, said tubes being offset circumferentially from adjacent nozzle passageways to receive fluid from the vanes when the turbine wheel exceeds a predetermined velocity, said tubes directing fluid received therein back to the back faces of the turbine vanes for impeding rotation of the turbine wheel, and means for circumferentially shifting said baffle assembly relative to said nozzle means for varying the downstream displacement of the tubes from the nozzle passageways to thereby vary the operating velocity range of the turbine wheel.

4. A turbine comprising a rotatably mounted turbine wheel having circumferentially spaced vanes radiating from the periphery thereof, a casing enveloping said vanes having an inlet chamber on one lateral side of the vanes and an outlet chamber on the opposite lateral side of the vanes, nozzle means between said inlet chamber and said vanes providing nozzle passages for impinging propelling fluid from the inlet chamber against the vanes to drive the wheel, a baffle assembly having circumferentially spaced baffles in said outlet chamber alongside of said vanes to receive fluid from the vanes whenever the turbine wheel exceeds a predetermined velocity, said baffles being curved to direct fluid from said vanes back against the back faces of the vanes for impeding rotation of the wheel, and means for circumferentially shifting said baffle assembly relative to said nozzle passages, the spaces between said baffles being unobstructed to accommodate free discharge of fluid from the vanes into the outlet chamber.

5. A turbine comprising a casing, a wheel rotatable in said casing, radially extending vanes in spaced circumferential relation around the periphery of said wheel, a casing enveloping said vanes and defining an annular inlet chamber on one side of said vanes, a nozzle ring in said casing between said chamber and said one side of said vanes having a plurality of circumferentially spaced passages for ejecting jet streams against the vanes, baffle means in said casing on the side of the vanes opposite the nozzle ring, said baffle means having a plurality of circumferentially spaced tubes with longitudinal axes extending radially from the axis of the wheel, said tubes having gaps along the lengths thereof communicating the interior of the tubes with the spaces between the vanes along the lengths of the vanes, said casing having a discharge chamber receiving said tubes and providing an unobstructed discharge path from the vanes in the spaces between the tubes, and the curvature of said tubes directing fluid received in the tubes through the gaps around the interior of the tubes and back against the back faces of the vane for impeding the rotation of the wheel.

6. A turbine comprising a casing having an annular inlet chamber on one lateral side thereof and a discharge chamber on the opposite lateral side thereof, a turbine wheel rotatable relative to said casing and having circumferentially spaced radial vanes extending into said casing in the path between the inlet and outlet chambers, a nozzle plate in the casing between the inlet chamber and said vanes, said nozzle plate having circumferentially spaced nozzle passageways for impinging fluid from the inlet chamber against said vanes to drive the wheel, a baffle assembly in said outlet chamber, said assembly including an outer ring carried by said casing, an inner ring supported from said outer ring in spaced concentric relation therein, and a plurality of radially extending longitudinally cleft tubes between the rings at circumferentially spaced intervals, each of said tubes communicating along its length with the nozzle vanes and the spaces between the nozzle vanes and adapted to direct fluid received from the nozzle vanes against the back faces of the vanes to impede rotation of the wheel, and means for circumferentially shifting said assembly relative to said casing for varying the spacing of said tubes relative to the inlet nozzle passageways.

7. An axial flow turbine comprising a casing having an axial inlet nozzle for propelling fluid and an outlet for discharging said fluid; a turbine wheel journaled in said casing having vanes thereon for driving said wheel, said vanes having front faces adapted to receive propelling fluid from said inlet nozzle; said vanes having back faces opposite said front faces; and a plurality of baffle means in said casing having an axial length at least equal to the axial lengths of the vanes and interposed between said vanes and said outlet around the entire periphery of the wheel, each baffle means being spaced from an adjacent baffle means to provide therebetween an unobstructed path from the vanes to the outlet, and each baffle means having a propelling fluid directing surface arranged to receive fluid from the front faces of the vanes as they pass the baffle and to direct the fluid against the back faces of the vanes along the fuel length of said back faces whenever the velocity of the wheel exceeds a predetermined range for impeding rotation of the wheel.

8. An axial flow turbine comprising a casing having an axial inlet for receiving propelling fluid and an outlet for discharging said fluid; a turbine wheel journaled in said casing having vanes disposed between said inlet and said outlet, each of said vanes having a front face and an opposed rear face; nozzles between said inlet and said vanes in said casing for directing propelling fluid from the inlet against the front faces of the vanes to drive the turbine wheel; and baffles in said casing between the vanes and said outlet, each of said baffles having an axial length at least equal to the axial lengths of the vanes, said baffles being circumferentially spaced around the entire periphery of the wheel to provide therebetween unobstructed paths between the vanes and outlet whereby propelling fluid from the nozzles during rotation of the turbine wheel within a predetermined speed range will be displaced in the direction of travel of the vanes and discharged from the vanes freely to said outlet, each of said baffles having a wall receiving fluid from said vanes whenever the speed of the wheel exceeds said range and the fluid is displaced by the vanes beyond the free discharge spaces between the baffles, and said fluid directing wall of each baffle being shaped to flow the fluid received from the vanes back against the full lengths of said back faces to oppose the action of the propelling fluid and limit the velocity of the wheel.

References Cited in the file of this patent

UNITED STATES PATENTS

| | | |
|---|---|---|
| 1,008,550 | Loewenstein | Nov. 14, 1911 |
| 1,113,484 | Ranstead | Oct. 13, 1914 |
| 1,170,547 | Kennedy | Feb. 8, 1916 |
| 1,307,703 | Sagberg et al. | June 24, 1919 |
| 1,529,632 | Nagler | Mar. 10, 1925 |
| 1,776,392 | Moody | Sept. 23, 1930 |
| 1,894,117 | Pollard | Jan. 10, 1933 |
| 2,206,723 | Graham | July 2, 1940 |
| 2,459,519 | Graham et al. | Jan. 18, 1949 |
| 2,575,682 | Price | Nov. 20, 1951 |
| 2,710,165 | Thomas | June 7, 1955 |
| 2,726,508 | Halford | Dec. 13, 1955 |
| 2,752,858 | Berges | July 3, 1956 |
| 2,815,188 | Nelson | Dec. 3, 1957 |

FOREIGN PATENTS

| | | |
|---|---|---|
| 951,944 | France | Apr. 25, 1949 |